(12) United States Patent
Hamada

(10) Patent No.: US 6,510,140 B1
(45) Date of Patent: Jan. 21, 2003

(54) ATM LINE EVALUATION APPARATUS CAPABLE OF SYNTHETIC EVALUATION

(75) Inventor: Hirokazu Hamada, Atsugi (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/186,264

(22) Filed: Nov. 4, 1998

(30) Foreign Application Priority Data

Nov. 11, 1997 (JP) .............................................. 9-327067

(51) Int. Cl.$^7$ .............................. H04J 1/16; H04L 12/28
(52) U.S. Cl. ...................... 370/242; 370/252; 370/395.1
(58) Field of Search ................................. 370/241, 242, 370/247, 248, 252, 395.1, 216, 217, 218, 219, 220, 221; 345/440, 440.2, 33, 35; 709/223, 224; 714/25, 30, 47, 48, 703, 776, 779

(56) References Cited

U.S. PATENT DOCUMENTS

| 5,553,235 A | | 9/1996 | Chen et al. | |
|---|---|---|---|---|
| 5,615,323 A | * | 3/1997 | Engel et al. | ................. 345/440 |
| 5,661,722 A | * | 8/1997 | Miyagi | .................... 370/395.1 |
| 5,666,477 A | * | 9/1997 | Maeda | ........................ 345/440 |
| 5,867,483 A | * | 2/1999 | Ennis et al. | ................. 370/252 |
| 6,141,326 A | * | 10/2000 | Minami | ....................... 370/244 |
| 6,320,585 B1 | * | 11/2001 | Engel et al. | ................. 345/440 |

OTHER PUBLICATIONS

Hideo Murakami et al: "Monitoring Method for Cell Transfer Performance in ATM Networks", NTT Review, JP, Telecommunications Association, Tokyo, vol. 4, No. 4, Jul. 1, 1992, pp. 38–44, XP000310841—p. 40, paragraph 3—p. 42, paragraph 4.2.

G. Keiser et al: "Test Traffic Generation Equipment and Algorithms for Evaluating ATM Networks", Computer Communications NL, Elsevier Science Publishers BV, Amsterdam, vol. 19, No. 12, Oct. 1, 1996, pp. 962–971, XP000635579, ISSN: 0140-3664—p. 964, paragraph 2.3—p. 966, paragraph 4.

* cited by examiner

*Primary Examiner*—Chau Nguyen
*Assistant Examiner*—Andy Lee
(74) *Attorney, Agent, or Firm*—Frishauf, Holtz, Goodman & Chick, P.C.

(57) ABSTRACT

In order to easily understand a synthetic quality degree, a ratio of each of parameters in the entirety, etc. in an ATM line to be evaluated, cell data is received from the ATM line and abnormal cells are detected by a misinserted cell detection section, a lost cell detection section and an errored cell detection section. The numbers of abnormal cells occurring in the same time period are counted by a misinserted cell count section, a lost cell count section and an errored cell count section. A total number graph display section displays a strip-shaped total number graph, which corresponds in length to a sum of count results of the respective count sections, successively on a time-axis of a screen of a display device. An items display section discriminatively displays a plurality of regions into which the total number graph is divided such that the regions have lengths corresponding to the numbers of abnormal cells counted by the respective count sections.

13 Claims, 6 Drawing Sheets

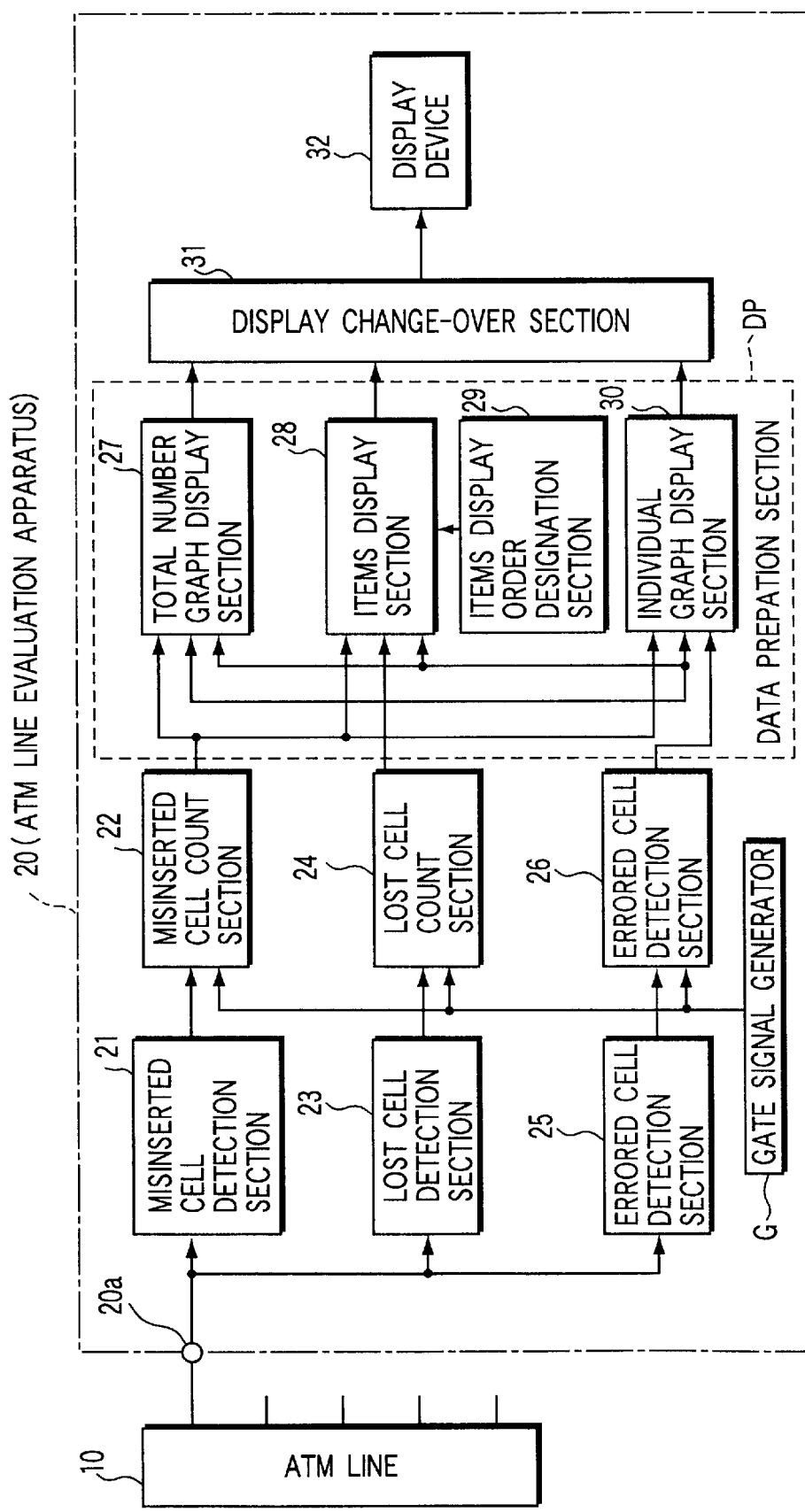
F I G. 1

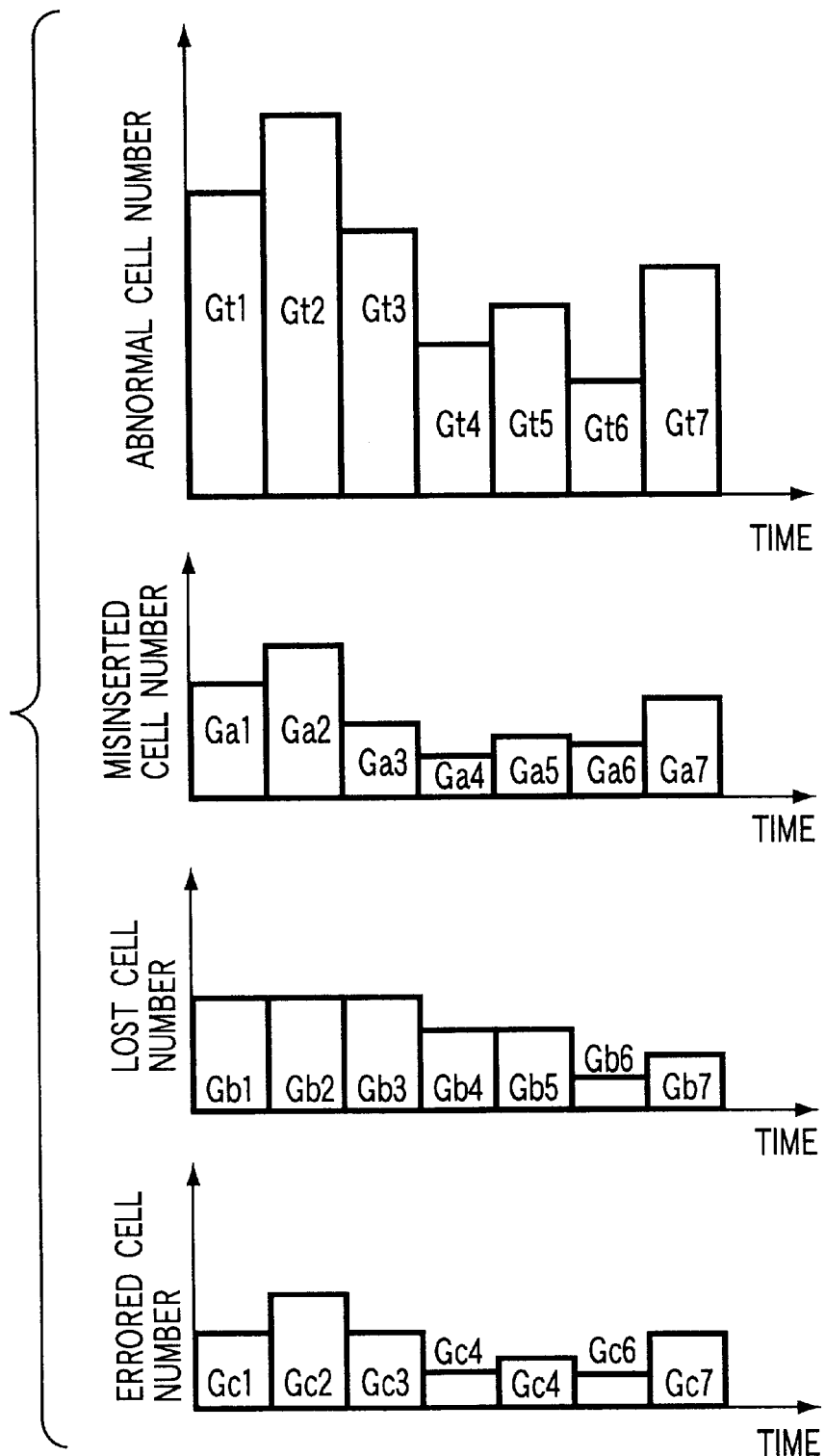
F I G. 6

ATM LINE EVALUATION APPARATUS CAPABLE OF SYNTHETIC EVALUATION

BACKGROUND OF THE INVENTION

The present invention relates generally to an ATM line evaluation system, and more particularly to an ATM line evaluation apparatus and method for performing an evaluation realizing easy understanding of a synthetic quality degree of ATM lines to be evaluated, the ratio of each parameter in the entirety, etc.

As is well known, in an ATM (Asynchronous Transfer Mode) line for use in data translation, cell data comprising a header portion and an information portion is used as a transmission data unit, and the cell data is transmitted to a line associated with address information of the header portion.

If a fault occurs in the process of data transmission, the cell data cannot be exactly transmitted.

It is thus necessary to periodically check the transmission quality of the ATM lines.

In general, the transmission quality of ATM lines is evaluated by the number of occurrence of three parameters: misinserted cell, lost cell, and errored cell. In other words, these three parameters are data considered on the basis of kinds of phenomena of errors. Specifically, these parameters correspond to the following phenomena.

The occurrence of the misinserted cell is a phenomenon in which cell data is sent due to a miswrite of address information of the cell data at a relay portion or a branch portion of the ATM line.

The occurrence of the lost cell is a phenomenon in which cell data is sent to an erroneous address due to the occurrence of the misinserted cell.

The occurrence of the errored cell is a phenomenon in which cell data including an error is sent.

The frequencies of occurrence of such abnormal cells are conventionally specified by the ATM line evaluation standard, etc. as important parameters for evaluating the transmission quality of ATM lines.

In the conventional ATM line evaluation apparatus, in order to evaluate the transmission quality of an ATM line, the number of occurrence of each of misinserted cell, lost cell and errored cell in a predetermined time period is found and each of the obtained parameters is individually displayed on a display device.

In the conventional ATM line evaluation apparatus, however, the obtained parameters are individually displayed, as mentioned above, that is, displayed on the basis of kinds of phenomena of errors. Thus, a synthetic quality degree of lines to be evaluated, the ratio of each parameter in the entirety, etc. cannot easily be understood.

Specifically, in the conventional method of individually displaying the three parameters, the sum of the three parameters cannot easily be determined. Consequently, for example, in a case where the number of occurrence of each parameter is low but the sum of the numbers of occurrence of three parameters is not negligible, this condition may be overlooked.

BRIEF SUMMARY OF THE INVENTION

The present invention has been made in consideration of the above circumstances, and its object is to provide a measuring apparatus enabling the user to first understand quantitatively the general quality (or general errors) of an ATM line or the details thereof, i.e. conditions of errors based on kinds of phenomena, and then to easily make a quality judgment or take a measure relating to the quality of ATM line without fail. More specifically, this invention aims at providing an ATM line evaluation system including an ATM line evaluation apparatus and method for performing an ATM line evaluation realizing easy understanding of a synthetic quality degree of ATM lines to be evaluated, the ratio of each parameter in the entirety, etc., by displaying a sum value of three parameters in a predetermined time period.

In order to achieve the above object, according to an aspect of the present invention, there is provided an ATM line evaluation apparatus comprising:

misinserted cell detection means for receiving cell data from an ATM line and detecting a misinserted cell occurring due to a defect in a transmission operation of the ATM line;

lost cell detection means for receiving cell data from the ATM line and detecting a lost cell occurring due to a defect in the transmission operation of the ATM line;

errored cell detection means for receiving cell data from the ATM line and detecting an errored cell occurring due to a defect in the transmission operation of the ATM line;

misinserted cell counting means for receiving an output from the misinserted cell detection means and counting the number of misinserted cells in a predetermined time period;

lost cell counting means for receiving an output from the lost cell detection means and counting the number of lost cells in a time period identical to the predetermined time period;

errored cell counting means for receiving an output from the errored cell detection means and counting the number of errored cells in a time period identical to the predetermined time period;

data preparation means for totaling an output from the misinserted cell counting means, an output from the lost cell counting means, and an output from the errored cell counting means, and preparing data for displaying a strip-shaped graph having a length corresponding to the total value; and display means for receiving an output from the data preparation means and displaying the strip-shaped graph.

In order to achieve the above object, according to another aspect of the invention, there is provided an ATM line evaluation method comprising the steps of:

receiving cell data from an ATM line and detecting a misinserted cell occurring due to a defect in a transmission operation of the ATM line;

receiving cell data from the ATM line and detecting a lost cell occurring due to a defect in the transmission operation of the ATM line;

receiving cell data from the ATM line and detecting an errored cell occurring due to a defect in the transmission operation of the ATM line;

receiving a detection output of the misinserted cell and counting the number of misinserted cells in a predetermined time period;

receiving a detection output of the lost cell and counting the number of lost cells in a time period identical to the predetermined time period;

receiving a detection output of the errored cell and counting the number of errored cells in a time period identical to the predetermined time period;

totaling a count output of the misinserted cell, a count output of the lost cell, and a count output of the errored cell, and preparing data for displaying a strip-shaped graph having a length corresponding to the total value; and receiving an output from the data preparation means and displaying the strip-shaped graph.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the structure of an ATM line evaluation apparatus according to an embodiment of the present invention;

FIG. 6 shows a display example of the ATM line evaluation apparatus according to the embodiment of the invention;

DETAILED DESCRIPTION OF THE INVENTION

Figure 2:
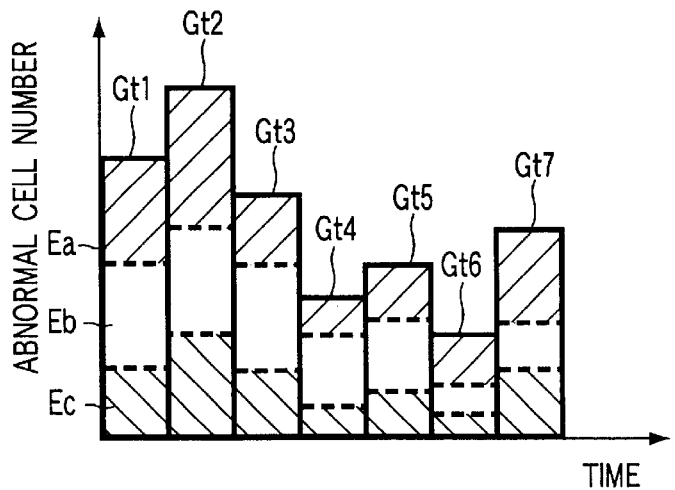
FIG. 2 shows a display example of the ATM line evaluation apparatus according to the embodiment of the invention.

Reference will now be made in detail to the presently preferred embodiments of the invention as illustrated in the accompanying drawings, in which like reference characters designate like or corresponding parts throughout the several drawings.

A summary of the invention will first be described.

An ATM line evaluation apparatus according to a first invention comprises:

a plurality of detection means (21, 23, 25) for receiving cell data from an ATM line and detecting, respectively, a plural kinds of abnormal cells occurring due to defects in the transmission operation of the ATM line;

a plurality of counting means (22, 24, 26) for counting the abnormal cells of the plural kinds, respectively, occurring in the same time period;

a display device (32) for displaying count results of the plural counting means; and total number graph display means (27) for enabling the screen of the display device to display a strip-shaped total number graph corresponding in length to the total of count results of the plural counting means.

An ATM line evaluation apparatus according to a second invention includes, in the ATM line evaluation apparatus of the first invention, items display means (28) for enabling the display device to discriminatively display a plurality of regions into which the total number graph is divided such that the respective regions correspond in length to the numbers of abnormal cells counted by the respective counting means.

An ATM line evaluation apparatus according to a third invention includes, in the ATM line evaluation apparatus of the first invention, individual graph display means (30) for enabling the display device to display strip-shaped individual graphs corresponding in length to the numbers of abnormal cells counted by the respective counting means at the same position as the total number graph.

Embodiments of the present invention, as summarized above, will now be described with reference to the accompanying drawings.

FIG. 1 is a block diagram showing the structure of an ATM line evaluation apparatus 20 according to an embodiment of the invention.

Specifically, as shown in FIG. 1, a line connection terminal 20a of the ATM line evaluation apparatus 20 is connected to one channel of the ATM line 10.

A misinserted cell detection section 21 of the ATM line evaluation apparatus 20 receives cell data input through the line connection terminal 20a, and detects occurrence of misinserted cell.

The misinserted cell detection section 21 monitors cell numbers recorded on the input cell data, detects a cell number non-sequential to the preceding and following cell numbers, for example, "5" in numbers "1→2→5→3→4→..." and outputs a misinserted detection signal indicating the occurrence of misinserted cell.

The misinserted cell detection signal is counted by a misinserted cell count section 22.

A lost cell detection section 23 receives cell data input through the line connection terminal 20a, and detects the occurrence of lost cell.

The lost cell detection section 23 monitors cell numbers recorded on the input cell data, detects missing of a cell number, for example, "4" in numbers "1→2→3→5→6→..." and outputs a lost cell detection signal indicating the occurrence of lost cell.

The lost cell detection signal is counted by a lost cell count section 24.

An errored cell detection section 25 receives cell data input through the line connection terminal 20a, compares data in the cell data with error check data, and determines whether there is an errored cell. If there is an errored cell, the errored cell detection section 25 outputs an errored cell detection signal.

The errored cell detection signal is counted by an errored cell count section 26.

The misinserted cell count section 22, lost cell count section 24 and errored cell count section 26 commonly receive a gate signal from a gate signal generator G, the gate signal having a predetermined cycle and rising to a high level for a predetermined time period. While the gate signal is at high level, the count sections 22, 24 and 26 count the detection signals output from the detection sections 21, 23 and 25. When the gate signal has lowered to low level, the count sections 22, 24 and 26 output the count results and reset the count values. When the gate signal has risen to high level again, the count sections 22, 24 and 26 start to count the detections signals.

In a case where measurement is performed in every predetermined time period, the level of the gate signal is alternately changed between "High" and "Low".

A total number graph display section 27 successively receives a misinserted cell number A, a lost cell number B and an errored cell number C counted by the count sections 22, 24 and 26 within the same time period (i.e. the high-level period of the gate signal), and prepares data for displaying a strip-shaped total number graph Gt corresponding in length to the total of the numbers A, B and C. In addition, the total number graph display section 27 successively supplies the data for displaying the strip-shaped total number graph Gt through a display change-over section 31 (to be described later) to the display device 32 such that the supplied data is displayed on the time-axis of the screen of the display device 32.

In this case, the width of the strip-shaped total number graph is freely chosen. A linear thin graph is included. The strip-shaped total number graph includes a concept of a bar graph.

An items display section 28 divides the total number graph Gt displayed by the total number graph display section 27 into three regions corresponding in length to the misinserted cell number A, lost cell number B and errored cell number C, and prepares data for discriminatively displaying the three regions. In addition, the items display section 28 supplies the data for discriminatively displaying the three regions through a display change-over section 31 (to be described later) to the display device 32 such that the supplied data is displayed on the time-axis of the screen of the display device 32.

An items display order designation section 29 designates, as desired, the order in which the items display section 28 divides the total number graph.

An individual graph display section 30 prepares data for displaying individual graphs Ga, Gb and Gc, which correspond in length to the misinserted cell number A, lost cell number B and errored cell number C counted by the count sections 22, 24 and 26 within the same time period and extend in the same direction as the total number graph Gt, in the width direction on the time-axis of the screen of the display device 32 which displays the total number graph Gt.

For example, when "items display" mode is designated between "items display" mode and "parallel display" mode, the display change-over section 31 enables the screen of the display device 32 to display the total number graph through the total number graph display section 27 and the items through the items display section 28.

When "parallel display" mode is designated, the display change-over section 31 enables the screen of the display device 32 to display the total number graph through the total number graph display section 27 and the individual graphs through the individual graph display section 30.

The total number graph display section 27, items display section 28, items display order designation section 29 and individual graph display section 30 may substantially be constructed as one data preparation section DP.

The display change-over section 31 may be included in the data preparation section DP, and these may be constructed by, for example, a microcomputer (CPU) and peripheral circuits such as operation keys and memories.

The operation of the ATM line evaluation apparatus having the above structure will now be described.

On the basis of the cell data sent to the connection channel of ATM line 10, the detection sections 21, 23 and 25 detect the misinserted cell, lost cell and errored cell and deliver detection outputs to the count sections 22, 24 and 26.

The count sections 22, 24 and 26 count the detection signals from the detection sections 21, 23 and 25 for a predetermined time period each time the gate signal from the gate signal generator G rises to high level, and output count results A, B and C successively.

The count results (A1, B1, C1), (A2, B2, C2), (A3, B3, C3), . . . , successively output from the count sections 22, 24 and 26 are delivered to the total number graph display section 27 and individual graph display section 29.

Suppose that "items display" mode is designated in the display change-over section 31 and the items display order designation section 29 designates an items display order of "misinserted cell number", "lost cell number" and "errored cell number", as viewed from above.

In this state, the total number graph display section 27 prepares data for displaying, as shown in FIG. 2, a bar-shaped total number graph Gt1 corresponding in length to the sum of first count results A1, B1 and C1 of count sections 22, 24 and 26. In addition, the total number graph display section 27 supplies through the display change-over section 31 the data for displaying the strip-shaped total number graph Gt1 to the display device 32 such that the supplied data is displayed on the time-axis of the screen of display section 32.

The items display section 28 divides the total number graph Gt1 into three regions Ea, Eb and Ec, from above, which correspond in length to the misinserted cell number A, lost cell number B and errored cell number C.

The items display section 28 prepares, for example, data for color display so that the three regions may be discriminated. In addition, the items display section 28 supplies through the display change-over section 31 the data for discriminatively displaying the three regions to the display device 32 such that the supplied data is successively displayed on the time-axis of the screen of display device 32.

If the next count results A2, B2 and C2 are obtained, a total number graph Gt2 corresponding to the sum of count results A2, B2 and C2 is displayed adjacent to the previous total number graph Gt1, and the items of the graph Gt2 are displayed as described above.

Similarly, total number graphs Gt3, Gt4, . . . , are successively displayed on the basis of the count results obtained with the passing of time, and the items thereof are displayed.

According to the ATM line evaluation apparatus of the present invention, the total number graph Gt and the items thereof are displayed and thus the synthetic quality degree of the ATM line and the variation with the passing of time can be easily understood on the screen of display device 32. Moreover, the magnitude and ratio of each parameter in the entirety can be easily understood.

In FIG. 2, the lower end of the region corresponding to the errored cell number C of the three parameters coincides with the time-axis. Thus, the magnitude of errored cell number C and the variation thereof with the passing of time can be exactly understood.

Figure 3:
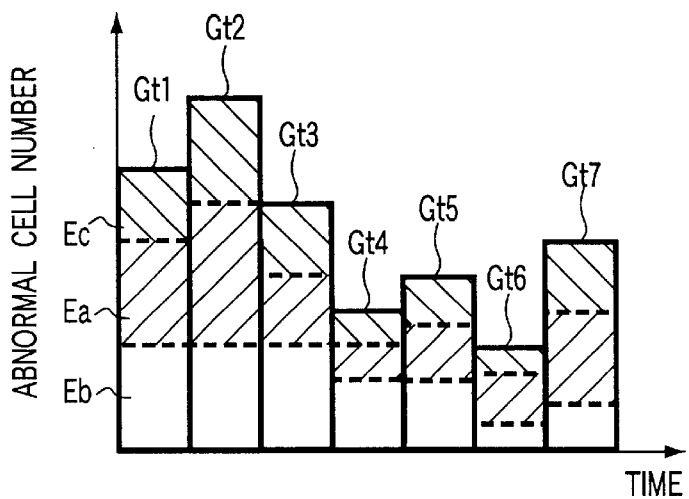
FIG. 3 shows a display example of the ATM line evaluation apparatus according to the embodiment of the invention.

If the region Eb corresponding to the lost cell number B is designated by the items display. order designation section 29 so as to be positioned at the lowest stage, as shown in FIG. 3, the lower end of the region Eb corresponding to the lost cell number B coincides with the time-axis. Thus, the magnitude of lost cell number B and the variation thereof with the passing of time can be exactly understood.

Similarly, if the region Ea corresponding to the misinserted cell number A is designated so as to be positioned at the lowest stage, the lower end of the region Ea corresponding to the misinserted cell number A coincides with the time-axis. Thus, the magnitude of misinserted cell number A and the variation thereof with the passing of time can be exactly understood.

Figure 4:
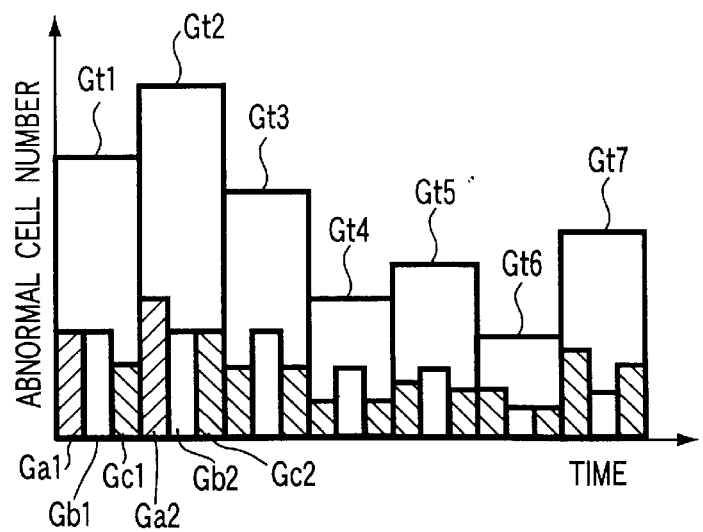
FIG. 4 shows a display example of the ATM line evaluation apparatus according to the embodiment of the invention.

When the "parallel display" mode is designated in the display change-over section 31, individual graphs Ga, Gb and Gc of the three parameters corresponding in length to the count results A, B and C of count sections 22, 24 and 26 and extending in the same direction as the total number graph Gt are displayed in the width direction on the time-axis of the screen of the display device 32 at the position where the total number graph Gt is displayed, as shown in FIG. 4.

Figure 5:
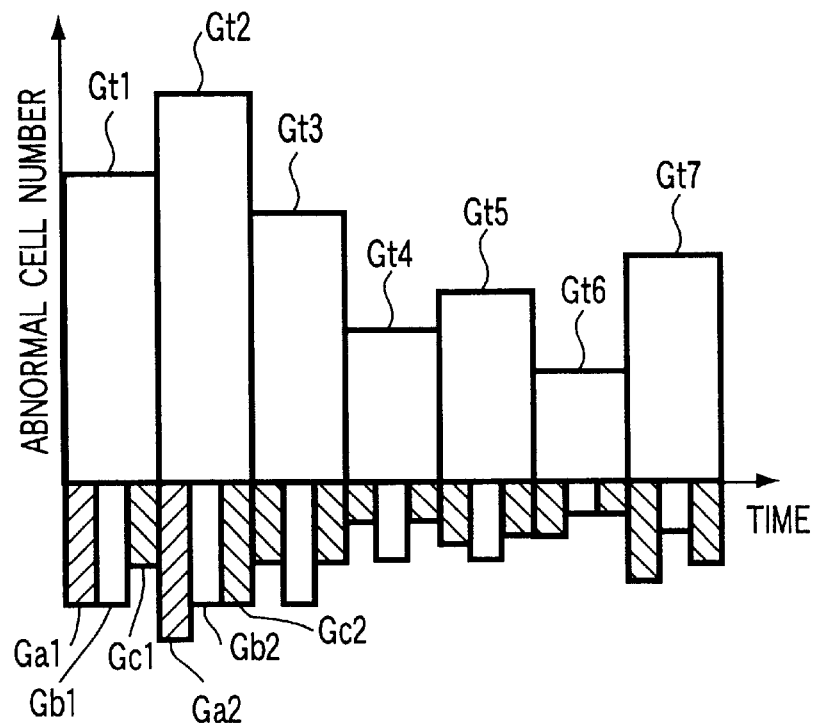
FIG. 5 shows a display example of the ATM line evaluation apparatus according to the embodiment of the invention.

The individual graphs Ga, Gb and Gc may be displayed, as shown in FIG. 5, so as to extend in a direction opposite to the direction of the total number graph Gt.

Since the total number graph Gt and individual graphs Ga, Gb and Gc are displayed on the same position on the time-axis, the synthetic quality degree of the line and the variation thereof with the passing of time can be easily understood and also the magnitudes of the three parameters, a difference thereamong and variations thereof can be exactly understood.

In the above description, the items of the total number graph Gt is displayed within the total number graph Gt, or the individual graphs are displayed at the same coordinates as the total number graph Gt. However, as shown in FIG. 6, there are provided, as well as the above display modes, a mode in which the total number graph Gt and individual graphs Ga, Gb and Gc are displayed on independent coordinates, or a mode in which the total number graph Gt alone is displayed. These display modes may be switched.

In the above embodiment, on the basis of the cell data sent to one channel of the ATM line, each parameter is found in a unit time and displayed on the time-axis of graph.

Figure 7:
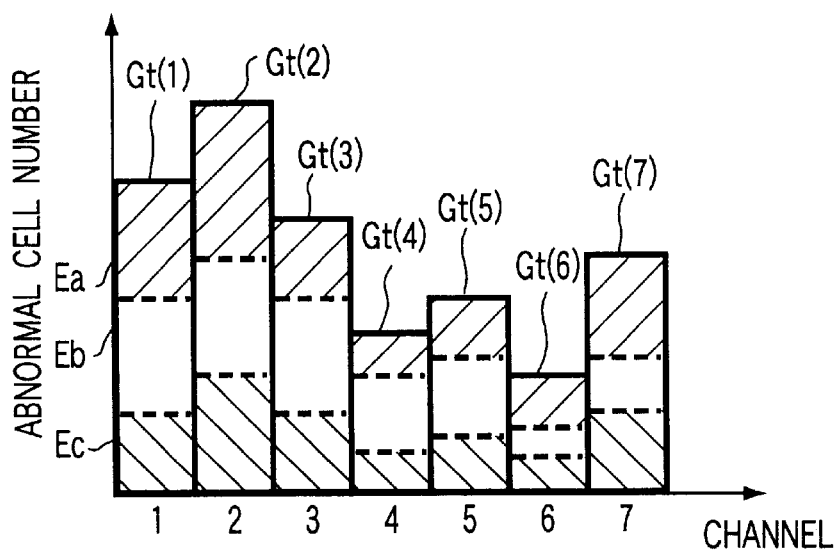
FIG. 7 shows a display example of an ATM line evaluation apparatus according to another embodiment of the invention.
Figure 8:
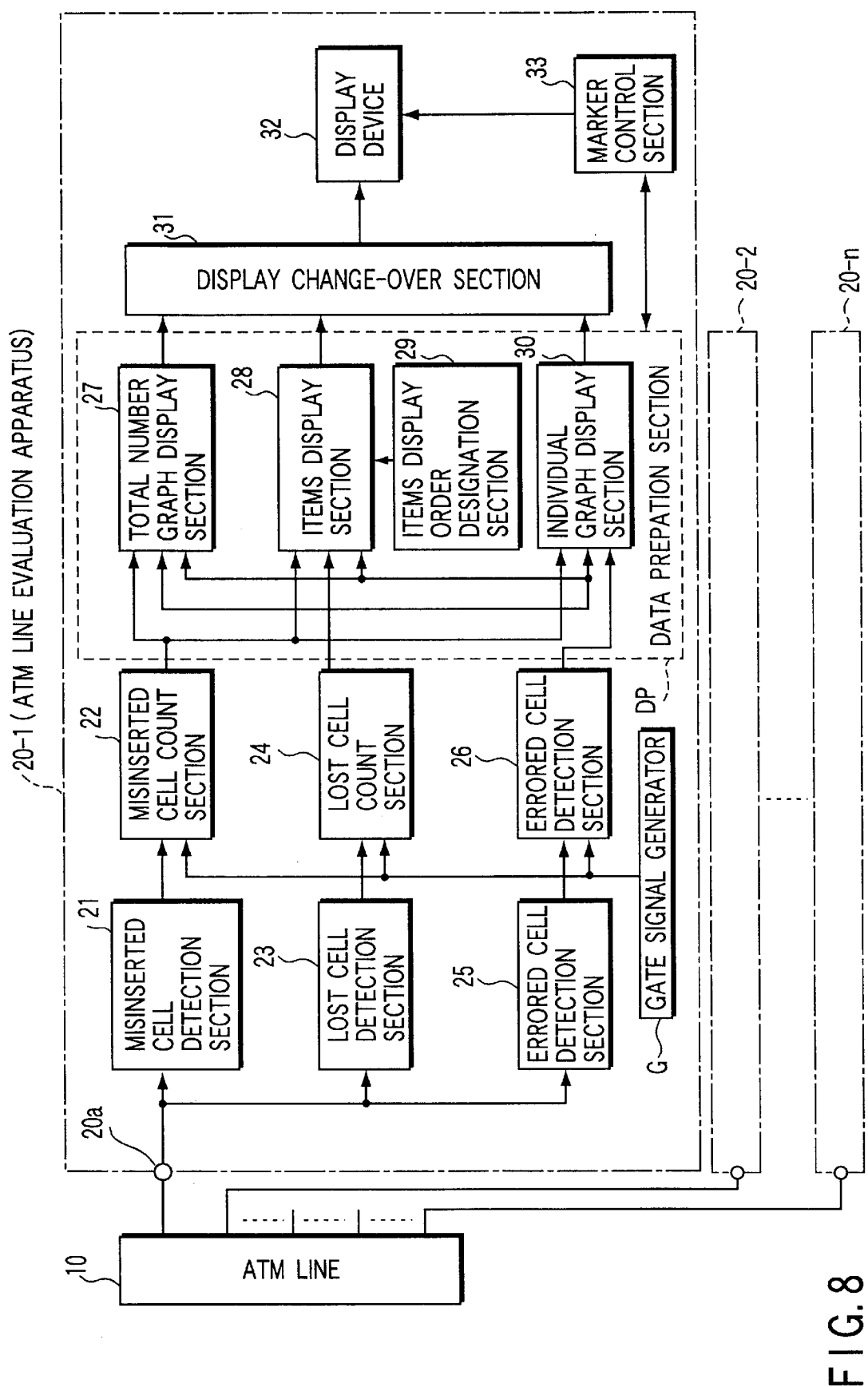
FIG. 8 is a block diagram showing the structure of an ATM line evaluation apparatus according to another embodiment of the present invention.

Alternatively, a construction as shown in FIG. 8 may be adopted. With this structure, in order to evaluate cell data sent to a plurality of channels, an ATM line evaluation apparatus 20-1 similar to the ATM line evaluation apparatus 20 shown in FIG. 1 may be combined with a plurality of ATM line evaluation apparatuses 20-2, . . . , 20-n each including the detection sections 21, 23 and 25, count sections 22, 24 and 26, total number graph display section 27 and individual graph display section 30. Each parameter is detected and counted in the same time period with respect to each channel of the ATM line, and on the basis of count results, total number graphs Gt(n) and the items thereof of the respective channels may be displayed, as shown in FIG. 7, and the channels may be compared.

The ATM line evaluation apparatus 20-1 shown in FIG. 8 is provided with a marker control section 33 associated with the data preparation section DP and display device 32.

Figure 9:
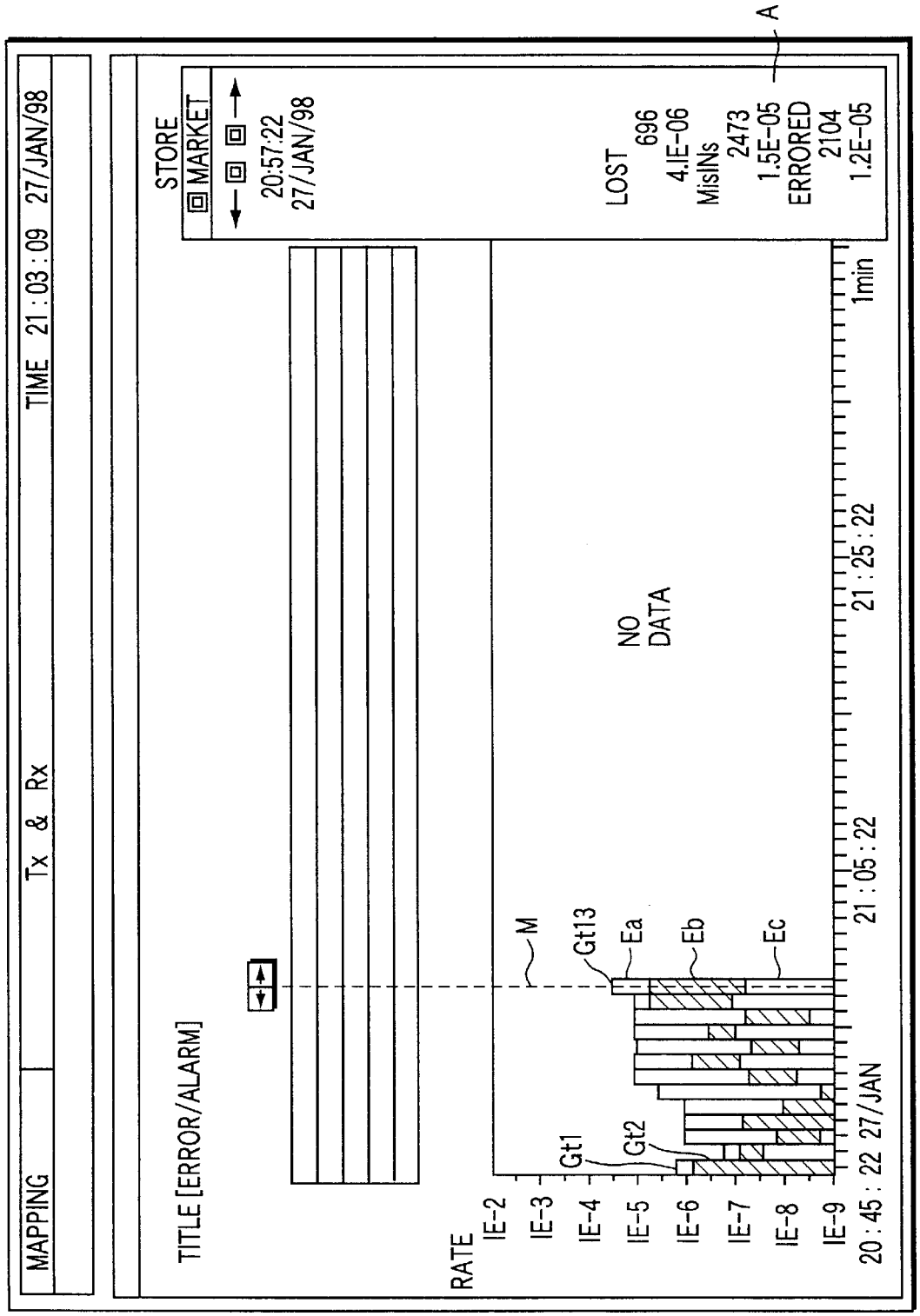
FIG. 9 shows a display example of the ATM line evaluation apparatus according to the embodiment shown in FIG. 8.

A marker M is designated by the marker control section 33, as shown in FIG. 9, at a desired position (Gt13 in FIG. 9) of total number graphs Gt1, Gt2, . . . , Gt13 displayed in a unit time as described above. Thus, the actual values of the misinserted cell number, lost cell number and errored cell number of the total number graph at the designated position are displayed at a lower right portion A of the display screen, for example, in such a fashion as "Lost 696; MisIns 2473; Errored 2104."

In other words, since the actual values of the misinserted cell number, lost cell number and errored cell number are displayed, these numbers, which are displayed in the preceding embodiment in the form of a ratio of three regions Ea, Eb and Ec in the total number graph, can be understood as actual values (numbers of error cells).

The ordinate in FIG. 9 showing the total number graph indicates the rate of errors, and the ratios of the three regions Ea, Eb and Ec are displayed in percentage. The rate of errors indicates the number of abnormal cells in the cells input in a predetermined time period. In the embodiment, the number of input cells can be theoretically derived from a pre-known transmission rate.

In the above embodiments, the parameters used for evaluating the ATM line are three: misinserted cell, lost cell and errored cell. However, other parameters may be included and displayed as described above.

In the above embodiments, the count sections 22, 24 and 26 count detection signals only during a time period in which the gate signal is at high level. In a case where the ATM line evaluation apparatus is constructed by a microcomputer, the internal timer may be operated for a predetermined time period and the number of abnormal cells detected in the predetermined time period may be counted and displayed in the graph.

Alternatively it is possible that each count section continuously counts the associated detection signals, the count result of each count section is memorized in a unit time, the previous memory value and the current memory value are compared, and on the basis of the comparison result (difference), the number of output detection signals in unit time is found and displayed in the graph.

As has been described above, according to the ATM line evaluation apparatus of the first invention, plural kinds of abnormal cells are detected, and the detection numbers in a predetermined time period is counted. A strip-shaped total number graph corresponding in length to the sum of the respective count results is displayed. Thereby, the accumulation value of the three parameters in the predetermined time period is displayed. Thus, the synthetic quality degree of the ATM line can be exactly and easily understood on the screen.

According to the ATM line evaluation apparatus of the second invention, a plurality of regions into which the total number graph is divided such that the respective regions correspond in length to the respective count results are discriminatively displayed. Thus, the synthetic quality degree of the ATM line and the ratio of each parameter in the entirety can be easily understood.

According to the ATM line evaluation apparatus of the third invention, individual graphs corresponding in length to the respective count results are displayed at the position where the total number graph is displayed. Thus, the synthetic quality degree of the ATM line, the ratio of each parameter, and a difference among the parameters can be easily understood.

Therefore, according to the present invention, abnormal cells of plural kinds are detected respectively, the numbers of detected cells are counted in a predetermined time period, and a strip-shaped total number graph corresponding in length to the sum of the respective detection results are displayed, whereby the sum value of three parameters in the predetermined time period is displayed. Therefore, the invention can provide an ATM line evaluation apparatus for performing an evaluation, wherein the synthetic quality degree of the ATM line to be evaluated, the ratio of each parameter in the entirety, etc. can be easily understood.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ATM line evaluation apparatus comprising:
   misinserted cell detection means for receiving cell data from an ATM line and detecting a misinserted cell occurring due to a defect in a transmission operation of the ATM line;
   lost cell detection means for receiving cell data from the ATM line and detecting a lost cell occurring due to a defect in the transmission operation of the ATM line;
   errored cell detection means for receiving cell data from the ATM line and detecting an errored cell occurring due to a defect in the transmission operation of the ATM line;
   misinserted cell counting means for receiving an output from the misinserted cell detection means and counting the number of misinserted cells in a predetermined time period;
   lost cell counting means for receiving an output from the lost cell detection means and counting the number of lost cells in a time period identical to said predetermined time period;
   errored cell counting means for receiving an output from the errored cell detection means and counting the number of errored cells in a time period identical to said predetermined time period;
   data preparation means for preparing data representing an output from the misinserted cell counting means, an output from the lost cell counting means, and an output from the errored cell counting means, and for preparing data representing a total value of the outputs from the misinserted cell counting means, the lost cell counting means and the errored cell counting means; and
   display means for receiving an output from the data preparation means and making a graphical display indicating both the total value of the outputs from the misinserted cell counting means, the lost cell counting means and the errored cell counting means as well as respective ratios between the outputs from the misinserted cell counting means, the lost cell counting means and the errored cell counting means.

2. The ATM line evaluation apparatus according to claim 1, wherein said graphical display comprises a strip-shaped graph having a length corresponding to the total value of the outputs from the misinserted cell counting means, the lost cell counting means and the errored cell counting means.

3. The ATM line evaluation apparatus according to claim 1, wherein said data preparation means also prepares data for displaying real numbers representing the output from the misinserted cell counting means, the output from the lost cell counting means, and the output from the errored cell counting means, and said display means displays said real numbers.

4. The ATM line evaluation apparatus according to claim 1, wherein said graphical display comprises a plurality of strip-shaped graphs each having a length corresponding to the total value of the outputs from the misinserted cell counting means, the lost cell counting means and the errored cell counting means in respective ones of a plurality of said predetermined time periods on a time-axis of the display means.

5. The ATM line evaluation apparatus according to claim 4, wherein said data preparation means also prepares data for enabling a marker to designate a position on the time-axis of the display means corresponding to a desired one of said predetermined time periods, and said display means displays real numbers representing the output from the misinserted cell counting means, the output from the lost cell counting means, and the output from the errored cell counting means in said desired predetermined time period corresponding to the position designated by the marker.

6. The ATM line evaluation apparatus according to claim 2, further comprising display order designation means for designating a display order of the output from the misinserted cell counting means, the output from the lost cell counting means, and the output from the errored cell counting means such that a lowest stage of the output from the misinserted cell counting means, the output from the lost cell counting means, and the output from the errored cell counting means coincides with a time axis of the strip-shaped graph.

7. An ATM line evaluation method comprising:
   receiving cell data from an ATM line and detecting a misinserted cell occurring due to a defect in a transmission operation of the ATM line;
   receiving cell data from the ATM line and detecting a lost cell occurring due to a defect in the transmission operation of the ATM line;
   receiving cell data from the ATM line and detecting an errored cell occurring due to a defect in the transmission operation of the ATM line;
   receiving a detection output of the misinserted cell and counting the number of misinserted cells in a predetermined time period;
   receiving a detection output of the lost cell and counting the number of lost cells in a time period identical to said predetermined time period;
   receiving a detection output of the errored cell and counting the number of errored cells in a time period identical to said predetermined time period;
   preparing data representing a count output of the misinserted cells, a count output of the lost cells, and a count output of the errored cells, and preparing data representing a total value of the count outputs of the misinserted cells, the lost cells, and the errored cells; and
   receiving the prepared data and making a graphical display indicating both the total value of the count outputs of the misinserted cells, the lost cells, and the errored cells as well as respective ratios between the count outputs of the misinserted cells, the lost cells, and the errored cells.

8. The ATM line evaluation method according to claim 7, wherein said graphical display comprises a strip-shaped graph having a length corresponding to the total value of the count outputs of the misinserted cells, the lost cells, and the errored cells.

9. An ATM line evaluation method comprising:
   receiving cell data from a plurality of ATM lines respectively and detecting a misinserted cell occurring due to a defect in a transmission operation of each of the ATM lines;
   receiving cell data from the plurality of ATM lines respectively and detecting a lost cell occurring due to a defect in the transmission operation of each of the ATM lines;
   receiving cell data from the plurality of ATM lines respectively and detecting an errored cell occurring due to a defect in the transmission operation of each of the ATM lines;

receiving detection outputs of the respective misinserted cells and counting the number of misinserted cells in a predetermined time period for each of the ATM lines;

receiving detection outputs of the respective lost cells and counting the number of lost cells in a time period identical to said predetermined time period for each of the ATM lines;

receiving detection outputs of the respective errored cells and counting the number of errored cells in a time period identical to said predetermined time period for each of the ATM lines;

preparing data representing a count output of the respective misinserted cells, a count output of the respective lost cells, and a count output of the respective errored cells for each of the ATM lines, and preparing data representing a total value of the count outputs of the respective misinserted cells, the respective lost cells, and the respective errored cells for each of the ATM lines; and receiving the prepared data and making a graphical display indicating both the total value of the count outputs of the respective misinserted cells, the respective lost cells, and the respective errored cells for each of the ATM lines as well as respective ratios between the count outputs of the respective misinserted cells, the respective lost cells, and the respective errored cells for each of the ATM lines.

10. The ATM line evaluation method according to claim 7, wherein said graphical display comprises a strip-shaped graph having a length corresponding to the total value of the count outputs of the respective misinserted cells, the respective lost cells, and the respective errored cells for each of the ATM lines.

11. An ATM line evaluation apparatus comprising:

a plurality of detection sections for receiving cell data from an ATM line and detecting plural kinds of abnormal cells occurring due to a defect in a transmission operation of the ATM line;

a plurality of count sections for respectively counting the plural kinds of abnormal cells which occur in an identical time period and are detected by said plural detection sections;

a display device for displaying count results of said plural count sections; and a graph display section for making a graphical display on a screen of the display device indicating both a total value of the count results of said plural count sections as well as respective ratios between the count results of said plural count sections.

12. The ATM line evaluation apparatus according to claim 11, wherein the graphical display comprises a strip-shaped total number graph which has an overall length corresponding to the total value of the count results of said plural count sections and which is divided into a plurality of regions each having a length corresponding to the count result of a respective one of said plural count sections.

13. The ATM line evaluation apparatus according to claim 11, wherein the graphical display comprises a strip-shaped total number graph which has an overall length corresponding to the total value of the count results of said plural count sections, and strip-shaped individual graphs which correspond in length to the respective count results of said plural count sections at a same position as the total number graph.

* * * * *